United States Patent Office 2,700,011
Patented Jan. 18, 1955

2,700,011

FUMIGATING COMPOSITIONS

James Taylor, Saltcoats, Scotland, assignor to Imperial Chemical Industries Limited, a corporation of Great Britain No Drawing. Application February 8, 1950, Serial No. 143,169

Claims priority, application Great Britain February 11, 1946

7 Claims. (Cl. 167—40)

This application is a continuation-in-part of applicant's application Serial No. 726,243 filed February 3, 1947, and now abandoned, and relates to the art of fumigating with pesticidal and fungicidal compounds. More particularly, this invention relates to the provision of an improved composition for the thermal production of fumes of pesticidal and fungicidal compounds which are capable of vaporization when suitably heated. This invention is especially valuable for the purpose of fumigating with combustible pesticidal and fungicidal compounds or pesticidal compounds and fungicidal compounds easily decomposed when overheated. The invention for instance, facilitates the economical production of a fume comprising an aerosol of the condensed vapor of the pesticidal or fungicidal compound which can deposit on the bounding surface of a closed space in which the fume is generated so as to produce a thin layer of the compound that will be active after the atmosphere is clear of the actual fumes.

Examples of pesticides and fungicides capable of depositing such layers when a suitable fumigation method is applied to volatilize it are gamma hexachlorocyclohexane, alpha-alpha-bis-(parachlorophenyl) beta-beta-beta-trichloroethane, parathion, pentachlorphenol and pentachlornitrobenzene. These insecticides and fungicides may be applied in the form of a smoke by volatilizing from hot plates or by other heating methods.

A combustible candle fumigator, similar to the familiar sulfur candle, would be a very convenient means for producing the fumes of a vaporizable pesticidal compound or fungicidal compound if these pesticides and fungicides could be made up into a candle in which they would be drawn into a flame for the purpose of volatilizing them without thereby being decomposed or burned with the formation of useless decomposition or combustion products. However, opposite to the case of the sulfur candle where the active insecticidal material is sulfur dioxide produced by the burning of the sulfur, this is impossible since these compounds form useless products when treated in this manner.

It has now been established that a self-sustained thermal decomposition of non-hygroscopic compounds comprising ammonium dichromate intimately mixed as a fuel agent with a proportion of such insecticides or fungicides can occur at temperatures which are, generally speaking, much below those experienced in ordinary instances of combustion. It is also known that as long as the decomposition of ammonium dichromate proceeds according to the equation $(NH_4)_2Cr_2O_7 \rightarrow Cr_2O_3 + N_2 + 4H_2O$, it contains no available oxygen and gives rise to no toxic gases and thus the pesticidal compounds, although typical oxidizable substances, should undergo little destruction when they undergo vaporization from a mixture thereof with the ammonium dichromate when the latter undergoes thermal decomposition and functions as a fuel agent.

According to the present invention, therefore, the improved fumigating composition consists of a non-hygroscopic mixture comprising a thermally vaporizable fumigating compound and a fuel for vaporizing said fumigating compound comprising a predominating amount of ammonium dichromate, i. e., more than 50% of ammonium dichromate. The relative proportions of the vaporizable fumigating compound to the fuel for vaporizing the fumigating compound may be varied between wide ranges depending upon the speed of vaporization desired, the amount of fumigant desired to be evolved per unit weight of mixture, the fumigant used, and the presence or absence of other non-hygroscopic agents in the fuel mixture referred to hereinafter. However, a preferred range of composition for most mixtures has been found to contain from about 20% to 40% of fumigant and from about 80% to 40% of fuel for vaporizing said fumigating compound.

Additional agents may be admixed with the ammonium dichromate to form the fuel having a predominating amount of ammonium dichromate and these agents serve as fillers, bulk residue decreasing agents, after-incandescence preventing agents, coolants, and temperature control modifying agents. These agents may be present preferably in an amount of from 0% to 50% of the weight of ammonium dichromate used in the mixture.

As examples of non-hygroscopic filling agents may be included sodium chloride, potassium chloride, cuprous chloride, china clay, kieslguhr and silica. These filling agents serve as inorganic diluents in the composition.

Additional examples of various non-hygroscopic coolant ingredients which may be used because of their other desirable effects are calcium oxalate and ammonium oxalate. These oxalates function additionally to reduce after-incandescence, prevent possible decomposition of the insecticide due to the attainment of excessive temperatures during the vaporization of the same, i. e., to thus act as coolants, and aid in preventing the occurrence of a bulky residue which would be objectionable to the users of the insecticidal composition.

As examples of the various non-hygroscopic modifying agents which may be used are potassium chloride, potassium nitrate and potassium dichromate. These so-called modifying agents are for the purpose of controlling the temperature and may be used to increase the temperature of decomposition which often becomes desirable upon including a higher amount of insecticide or fungicide in the mixture's composition.

Another agent serving to prevent the formation of bulky residue is guanidine nitrate.

These agents when used in conjunction with the thermally vaporizable pesticides and ammonium dichromate form normally non-hygroscopic compositions which are of value since the compositions may be stored without the need of waterproof cartridges and without fear of the absorption of water which would destroy the effectiveness of the compositions in vaporizing the pesticidal or fungicidal compounds.

A cartridge made up from a charge of the composition of the present invention and a casing for said charge which need not be waterproof may advantageously include a small piece of fuse or match composition in contact with the fumigating charge in order to facilitate the ignition of the latter with an ordinary domestic friction match, electric fuse head or other source of ignition. The fumigating charge may be in compact form and is produced by compressing the pulverulent mixture of ingredients. Alternately, the mixture may be made into compact form with the aid of a binder or bonding agent and may be extruded or molded into form. If desired, the fumigating charge may also conveniently be lightly compacted in a cartridge having a paper or other suitable wrapper or envelope.

When a local portion of the charge is strongly heated by the ignition of the match composition or the like, a gas evolving decomposition accompanied by the evolution of the pesticidal fume and unaccompanied by flame will propagate itself throughout the charge. The fumigating charges provided, according to the present invention, are therefore both safe and convenient for application in confined spaces.

The invention is illustrated by the following examples in which the parts used are parts by weight.

Example I 30 grams of an intimate mixture of 75 parts of pulverulent ammonium dichromate, 5 parts calcium oxalate, and 20 parts hexachlorocyclohexane in powder form is lightly compacted into a cartridge one inch in diameter The hexachlorocyclohexane contains approximately 10% of the insecticidal gamma isomer. The cartridge is provided with an ignition system comprising potassium nitrate impregnated puranier woodpulp and celluloid and is cellophane wrapped.

As explained supra, the calcium oxalate functions primarily as a bulk residue decreasing agent.

Example II 30 grams of an intimate mixture consisting of 50 parts of ammonium dichromate, 20 parts guanidine nitrate and 30 parts of hexachlorocyclohexane are compacted into a cartridge as set forth in Example I. This composition is non-hygroscopic under ordinary conditions of temperature and humidity but is not non-hygroscopic when subjected to several weeks storage at 35° C. and 90% or more humidity.

Example III 30 grams of an intimate mixture of 80 parts of pulverulent ammonium dichromate and 20 parts of alpha-alpha-bis-(parachlorophenyl) beta - beta - beta - trichloroethane in powder form is lightly compacted into a cartridge one inch in diameter having a thin paper envelope. A strip of potassium nitrate impregnated puranier woodpulp is provided at one end for ignition by a domestic friction match.

The following Examples IV through XIV containing the percentage indicated in each example were made up in the form of the compositions of Example I and produced the results indicated.

Example IV

Ammonium dichromate_____per cent__ 48
Sodium chloride_____do____ 15
China clay_____do____ 5
Pentachlornitrobenzene _____do____ 32
Rate of burning, 65 secs. for 50 gms.
Temp. of ignition zone, 460° C.

Example V

Ammonium dichromate_____per cent__ 40
China clay_____do____ 15
Pentachlornitrobenzene _____do____ 45
Rate of burning, 205 secs. for 50 gms.
Temp. of ignition zone, 400° C.

Example VI

Ammonium dichromate_____per cent__ 48
China clay_____do____ 20
Pentachlornitrobenzene _____do____ 32
Rate of burning, 85 secs. for 50 gms.
Temp. of ignition zone, 480° C.

Example VII

Parathion (technical)_____per cent__ [1] 18.2
Kieselguhr _____do____ 18.2
Ammonium dichromate_____do____ 63.6

Ignites and burns satisfactorily.

[1] Equiv. to parathion pure 14.0%.

Example VIII

Ammonium dichromate _____per cent__ [1] 64
D. D. T._____do____ [1] 36

[1] 36 secs. for 56 gms. temp. of ignition zone, 370° C.

Example IX

Ammonium dichromate_____per cent__ 62
Potassium nitrate _____do____ 3
D. D. T._____do____ 35
Burning speed, 49 secs. for 46 gms.
Temp. of ignition zone, 520° C.

Example X

Ammonium dichromate_____per cent__ 60
Pentachlorphenol _____do____ 40
Temp. of ignition zone, 400° C.

Example XI

Ammonium dichromate_____per cent__ 70
Benzene hexachloride_____do____ 30
Time of burning of 23.3 gms., 22 secs.

Example XII

Ammonium dichromate_____per cent__ 80
D. D. T._____do____ 20
Time of burning of 35 gms., 20 secs.

Example XIII

Ammonium dichromate _____per cent__ 75
Calcium oxalate _____do____ 5
Benzene hexachloride _____do____ 20

Example XIV

Ammonium dichromate _____per cent__ 65.0
Sodium chloride_____do____ 14.4
Azobenzene _____do____ 12.0
Kieselguhr _____do____ 4.3
Parathion (technical) _____do____ [1] 4.3
Ignites and burns satisfactorily.

[1] Equiv. to 3.0% parathion pure.

Each of Examples I through XIV were non-hygroscopic and produced a pesticidal fume unaccompanied by flame in accordance with the objects and purposes of this invention. The present invention, as opposed to the United States patent to Flanders et al. 2,440,082 as stated, is non-hygroscopic. The ammonium nitrate present in the composition of Flanders serves as the fuel for thermally vaporizing the pesticidal compound and this fuel is sensitized by the smaller amount of potassium chromate present. The present invention, on the other hand, does not use the objectionably hygroscopic ammonium nitrate of Flanders as a fuel agent but instead, utilizes a fuel whose predominating content is ammonium dichromate. Other agents may be present in the fuel compositions of the present application as outlined supra for the purpose of acting as fillers, coolants, temperature control modifying agents, after-incandescence preventing agents and bulk residue preventing agents.

I claim:

1. A non-hygroscopic fumigating composition consisting of a thermally vaporizable fumigant compound and a fuel for vaporizing said fumigant, the fumigant being in amount from about 20% to 40% by weight of the total composition and being selected from the group consisting of gamma hexachlorocyclohexane, alpha-alpha-bis-(parachlorophenyl) beta - beta - beta - trichloroethane, parathion, pentachlorphenol, pentachlornitrobenzene, dichloro-diphenyl-tri-chloroethane and benzene hexachloride, and said fuel comprising more than 50% by weight of the fuel of ammonium dichromate.

2. A fumigating composition as claimed in claim 1 wherein said fumigant is gamma hexachlorocyclohexane.

3. A fumigating composition as claimed in claim 1 wherein said fumigant is alpha-alpha-bis-(parachlorophenyl) beta-beta-beta-trichloroethane.

4. A fumigating composition as claimed in claim 1 wherein said fumigant is parathion.

5. A fumigating composition as claimed in claim 1 wherein said fumigant is pentachlorphenol.

6. A fumigating composition as claimed in claim 1 wherein said fumigant is pentachlornitrobenzene.

7. A non-hygroscopic fumigating composition as claimed in claim 1 wherein said fuel includes a coolant selected from the group consisting of calcium oxalate and ammonium oxalate.

References Cited in the file of this patent

UNITED STATES PATENTS

| | | |
|---|---|---|
| 2,154,221 | Taylor | Apr. 11, 1939 |
| 2,409,111 | Davis | Oct. 8, 1946 |
| 2,440,082 | Flanders et al. | Apr. 20, 1948 |
| 2,532,349 | Taylor | Dec. 5, 1950 |

OTHER REFERENCES

Davis, Chem. of Powder and Explosives, vol. II, John Wiley and Sons, Inc., N. Y. C., N. Y. (1943), pp. 322–325.